(12) United States Patent
Schneider

(10) Patent No.: US 9,547,777 B2
(45) Date of Patent: Jan. 17, 2017

(54) VALIDATING COMPRESSED ARCHIVE KEYS

(75) Inventor: James Paul Schneider, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 1399 days.

(21) Appl. No.: 12/201,466

(22) Filed: Aug. 29, 2008

(65) Prior Publication Data

US 2010/0054468 A1 Mar. 4, 2010

(51) Int. Cl.
| G06F 21/00 | (2013.01) |
| G06F 21/64 | (2013.01) |
| G06F 11/14 | (2006.01) |
| G06F 21/62 | (2013.01) |
| H04L 9/06 | (2006.01) |

(52) U.S. Cl.
CPC ........... *G06F 21/64* (2013.01); *G06F 11/1456* (2013.01); *G06F 21/62* (2013.01); *H04L 9/0656* (2013.01); *G06F 2221/2107* (2013.01); *H04L 2209/30* (2013.01); *H04L 2209/34* (2013.01)

(58) Field of Classification Search
CPC ...... G06F 21/64; G06F 21/62; G06F 11/1456; G06F 2221/2107; H04L 9/0656; H04L 2209/30; H04L 2209/34

USPC ...................................................... 380/37, 59
See application file for complete search history.

(56) References Cited

U.S. PATENT DOCUMENTS

| 5,642,421 A * | 6/1997 | Gray et al. ..................... 713/160 |
| 6,941,461 B2 * | 9/2005 | Carro et al. ................... 713/181 |
| 7,010,689 B1 * | 3/2006 | Matyas et al. ................ 713/168 |
| 7,844,579 B2 * | 11/2010 | Peterson et al. ............. 707/661 |
| 7,941,409 B2 * | 5/2011 | Mimatsu ................. H03M 7/30 707/687 |
| 2005/0235163 A1 * | 10/2005 | Forlenza et al. ............. 713/193 |
| 2007/0094309 A1 * | 4/2007 | Buckingham et al. ....... 707/202 |
| 2009/0041235 A1 * | 2/2009 | Reitmeier et al. ............. 380/42 |

* cited by examiner

*Primary Examiner* — John B King
(74) *Attorney, Agent, or Firm* — Lowenstein Sandler LLP

(57) ABSTRACT

An apparatus and a method for validating compressed encrypted archive keys is described. In one embodiment, a pseudo-stream is generated for an archive. The pseudo-stream is made of a small amount of random text. The pseudo-stream is attached to a stream of the archive. The pseudo-stream and stream are compressed using the compression algorithm that includes validation data. The compressed pseudo-stream is then enciphered with an archive key.

17 Claims, 6 Drawing Sheets

VALIDATING COMPRESSED ARCHIVE KEYS

TECHNICAL FIELD

Embodiments of the present invention relate to computing systems, and more particularly, to secure archive storage.

BACKGROUND

Archives are file systems and documents that are stored in persistent storage systems. Persistent storage systems include fixed optical or magnetic drives, flash memory devices, and removable storage devices such as read-write compact discs (RW-CDs) drives and magnetic tape drives. These archives are enciphered to secure the contents of the drive by limiting access to the contents of the archive to a user supplying a correct password.

The enciphering process that creates or adds to an archive requests a password from a user. The password is then input into a hashing algorithm to produce a key. The key is utilized to encipher the entire archive using a block cipher algorithm. However, this system presents several security and logistical problems. If the same password is used for multiple archives, then the same key is generated for each archive. Determining a key that is utilized to encipher data is made easier when a larger set of enciphered data is available. Thus, using the same key for multiple archives is not desirable, because it creates a large data set that is more vulnerable to unauthorized access.

Another problem with the use of this method and system is that the change of a password requires that the entire archive be re-enciphered using a new key generated from the new password. Archives can be large and re-enciphering these archives can be time consuming and inconvenient. All archives enciphered with a changed key must be deciphered and then re-enciphered with a new key. Also, archives can be distributed over multiple volumes, which can be on seperate devices or discs. As a result, the changing of the password can be very time and resource consuming especially for large archives or archives with multiple volumes.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for validating compressed encrypted archive keys. In one embodiment, an apparatus and a method for validating compressed encrypted archive keys is described. In one embodiment, a pseudo-stream is generated for an archive. The pseudo-stream is made of a small amount of random text. The pseudo-stream is attached to a stream of the archive. The pseudo-stream and stream are compressed using the compression algorithm that includes validation data. The compressed pseudo-stream is then enciphered with an archive key.

Figure 1:
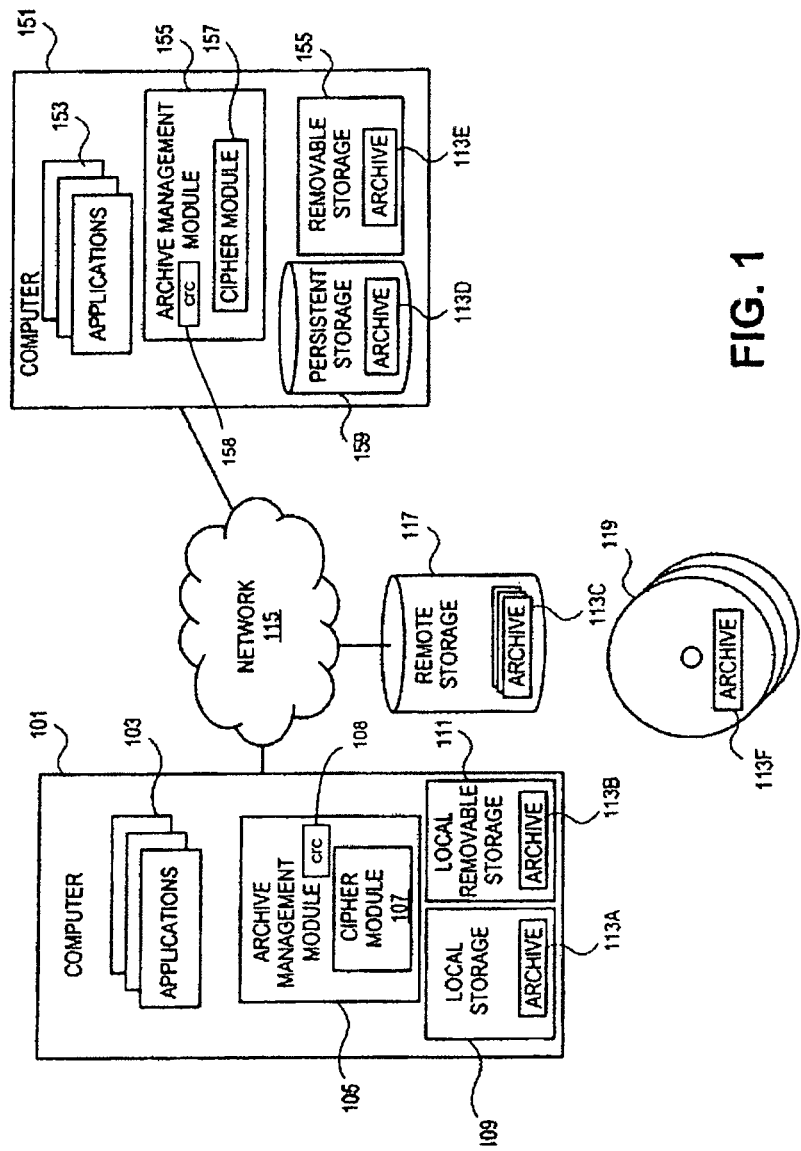
FIG. 1 is a block diagram illustrating one embodiment of a system for archive storage.

FIG. 1 is a block diagram illustrating one embodiment of a system for archive storage. The system for archive management includes at least one computer 101 having an archive management module 105 and at least one local storage device 109, 111. The system may also include additional computers 151, remote storage units 117, and network connections 115.

Computer 101 can be any type of computing device including a desktop computer, laptop computer, server, handheld device, console device, wireless device or similar computing device. The computer can execute any number of applications 103. These applications can be any type of applications including word processing applications, web browsing applications and similar applications. The applications 103 can generate date to be stored in local or remote storage devices.

Computer 101 can also include any number of local storage devices. Local storage devices may be fixed 109 or removable storage devices 111. Local fixed storage devices 109 can include a hard drive (magnetic storage device), flash memory device, optical storage device or similar fixed storage device. Removable storage devices 111 can include a read/write compact disc players, digital versatile disc (DVD) players, high definition (HD) disc players such as a BLU-RAY or HD DVD read/write drives and magnetic storage drive such as a tape or ZIP disk storage drives or similar storage devices that store data in associated media 119.

Computer 101 includes an archive management module 105. The archive management module 105 is a program or component of the computer 101 that enables applications 103, operating system components and similar programs on the computer 101 to access and store data in archives in the local storage devices 109, 111. The applications 103 or other programs can directly call the archive management module 105 or a user can interact with the archive management module to archive data files stored in the storage devices 109, 111.

In one embodiment, the archive management module 105 includes a cipher module 107 and a compression module 108. The cipher module 107 enciphers data to be stored in an archive or deciphers data stored in an archive. An archive may be enciphered to protect the data within that archive from malicious manipulation or for other security purposes by controlling access through use of the password. The cipher module 107 can also manage and maintain password protection for the archives. Password management can include clearing a user for a password when accessing a persistent storage device and providing an interface for a user to change a password for an archive.

Compression module 108 compresses or decompresses data stream stored in the archive. In one embodiment, compression module 108 uses a compression algorithm that includes validation data in the form of a pair of cyclic redundancy check (CRC) values associated with a compressed stream: one for the precompressed stream, and one for the compressed version. Those of ordinary skills in the art will recognize that other error-detecting code may be used in compression module 108 to detect alteration of data in the storage.

Other components can be linked to the computer system 101 over a network 115. The network 115 can be any type of network including a local area network (LAN), a wide area network (WAN), such as the Internet or similar networks. The network can have wired or wireless components. Any number of devices may be in communication with one another over the network 115. In one embodiment, the archive management module 105 enables the computer 101 and applications 103 on the computer 101 to interface with archives on other devices such as a remote storage unit 117 or another computer 151. The archive management module 105 can access these other storage archives directly or through intermediate programs or protocols. For example, the archive management module 105 can interface with another archive management module 155 to access archives local to that archive management module 155.

A remote storage device 117 can be a network server or storage device such as an external hard drive connected over a USB network or a remote backup device or similar storage device. The remote storage device 117 can store any number of archives 113C and provide access to these archives to any number of archive management modules 105, 155.

Computer 151 can be any type of computer including a desktop computer, server, laptop computer, handheld device, wireless device, console device or similar computing device. The computer 151 can include each of the elements described above in regard to computer 101. These components can include applications 153, archive management module 155, cipher module 157, compression module 158, fixed storage devices 159, removable storage device 155 and similar components.

Any number of archives 113A-F can be stored on any of the available storage devices. Any number of separate archives can be stored on any single device. Likewise, individual archives can be distributed across any number of these devices. The archives can have any format or size.

Figure 2:
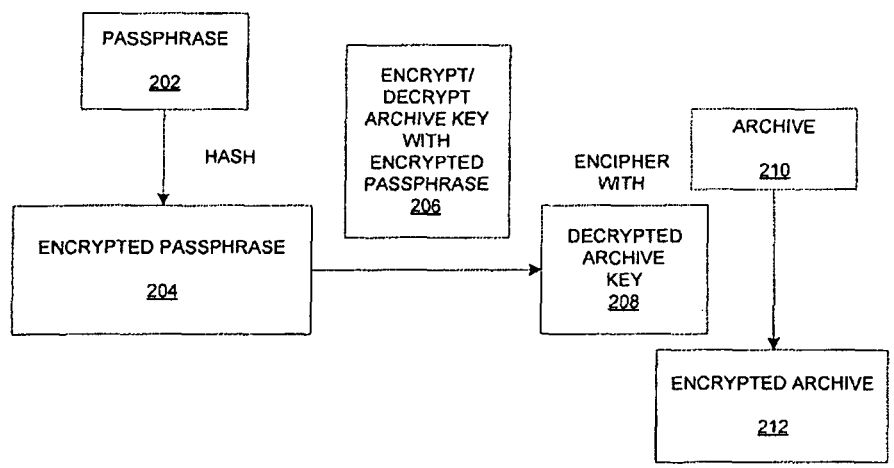
FIG. 2 is a flow diagram illustrating one embodiment of a method for enciphering an archive.

FIG. 2 is a flow diagram illustrating one embodiment of a method for enciphering an archive. A passphrase 202 is enciphered using for example, a simple iterated hash. The enciphered passphrase 204 is used as the key to encipher the key or keys 208 used to encipher the archive 210 into an encrypted archive 212. The archive key is encrypted with the encrypted passphrase as a key at 206. As such, no part of the key is derived directly from the passphrase.

Figure 3:
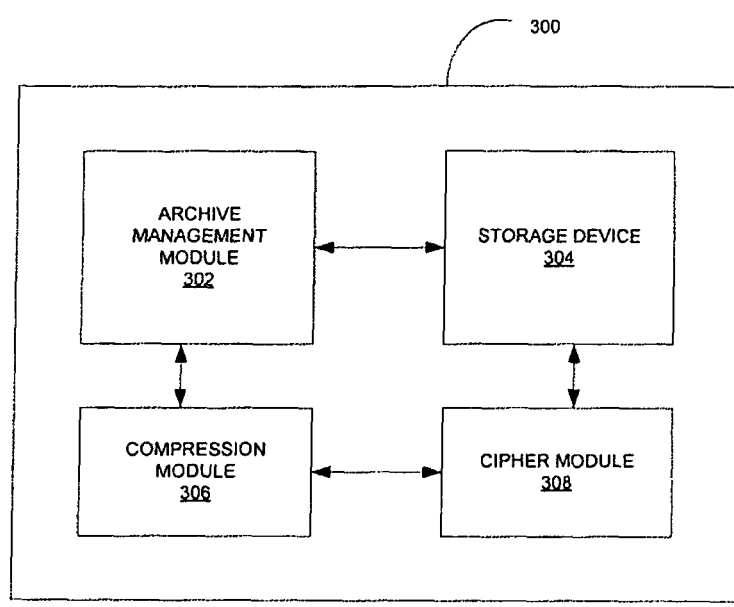
FIG. 3 is a block diagram illustrating one embodiment of a validation module.

FIG. 3 is a block diagram illustrating one embodiment of a computer 300 with a storage device 304. The computer 300 includes at least an archive management module 302 configured to manage the storage of data in an archive on the storage device 304. A compression module 306 is coupled to the archive management module 302. The compression module 306 is configured to compress a pseudo-stream of the archive. A cipher module 308 is coupled to the compression module 306. The cipher module 308 is configured to encipher the compressed pseudo-stream with an archive key.

Figure 4:
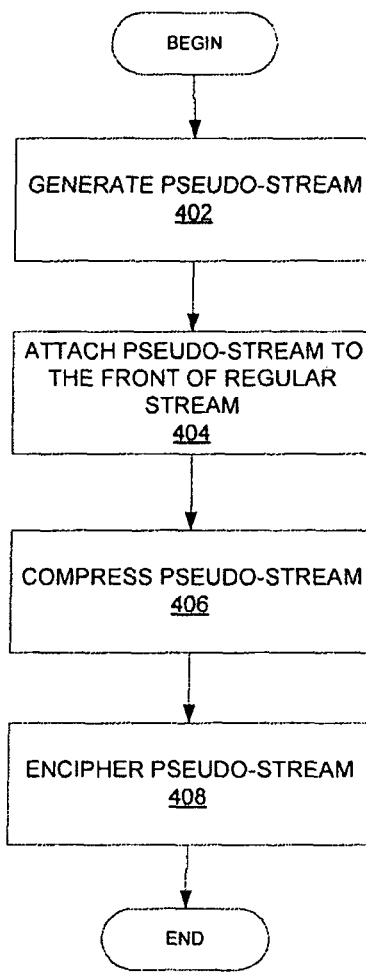
FIG. 4 is a flow diagram illustrating one embodiment of a method for compressing and enciphering an archive.

FIG. 4 is a block diagram illustrating one embodiment of a method for compressing and enciphering an archive. At 402, a pseudo-stream may be generated. The pseudo-stream can consist of a short amount of random text. The random text does not have to be compressible, if the compressed and uncompressed forms of an uncompressible stream are radically different. In one embodiment, the pseudo-stream includes 1-2 k bytes of words from the English language, selected at random.

At 404, the pseudo-stream is added in front of the original data stream. At 406, the pseudo-stream is compressed using a compression algorithm that includes a error-checking code, such as CRC. At 408, the pseudo-stream is enciphered using, for example, the algorithm described with respect to FIG. 2.

Figure 5:
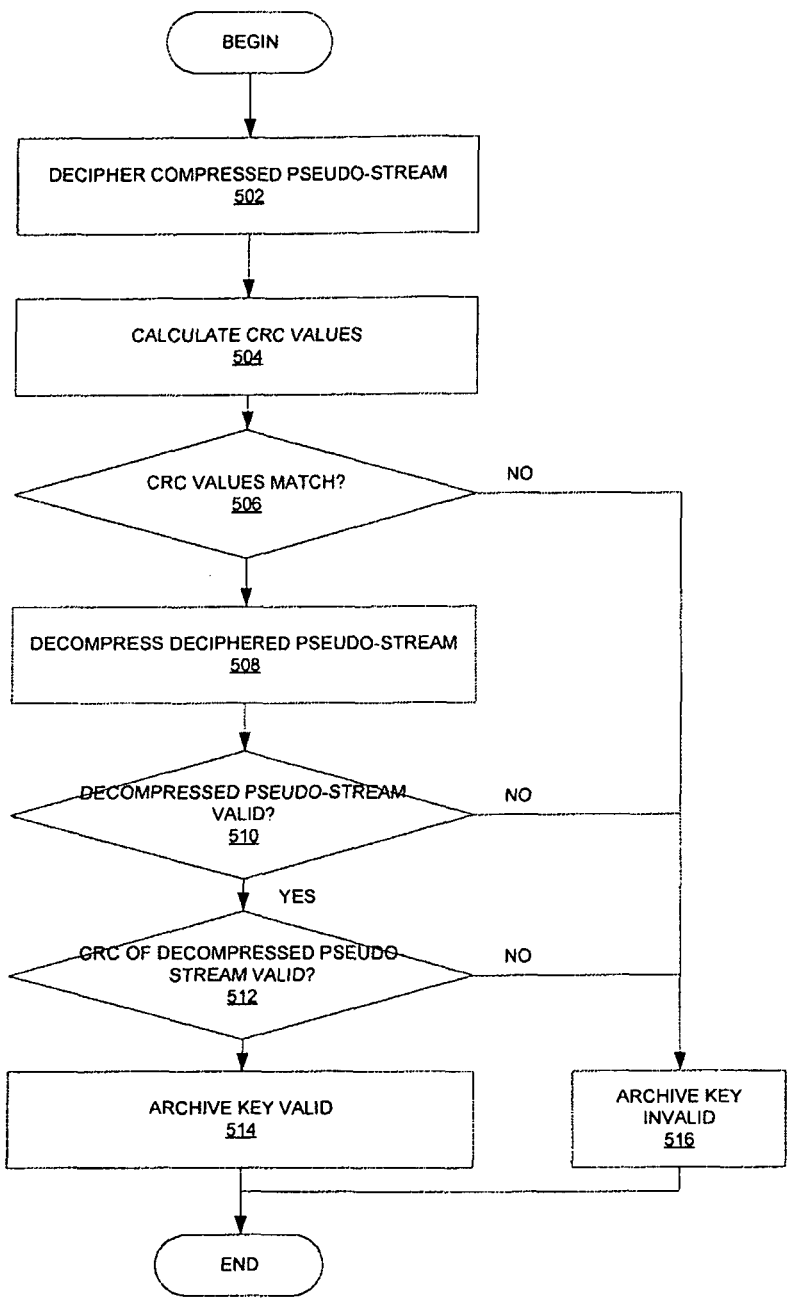
FIG. 5 is a flow diagram illustrating one embodiment of a method for deciphering and decompressing an archive.

FIG. 5 is a flow diagram illustrating one embodiment of a method for deciphering and decompressing an enciphered and compressed archive. At 502, an enciphered and compressed pseudo-stream is deciphered using, for example, the algorithm described with respect to FIG. 3. At 504, the CRC values are calculated over the compressed deciphered pseudo-stream and checked for their validity at 506. If the CRC values do not match, the archive key associated with the deciphered pseudo-stream is found invalid at 516. Otherwise, the compressed deciphered pseudo-stream is decompressed at 508 with a compression module. The validity of the decompressed deciphered pseudo-stream is determined at 510. If the deciphered pseudo-stream pseudo-stream cannot be decompressed, the archive key associated with the deciphered pseudo-stream is found invalid at 516. The CRC values of the decompressed deciphered pseudo-stream are also checked at 512. If the CRC values do not match, the archive key associated with the deciphered pseudo-stream is found invalid at 516. If the CRC values match, the archive key associated with the decompressed deciphered pseudo-stream is found valid at 514.

Figure 6:
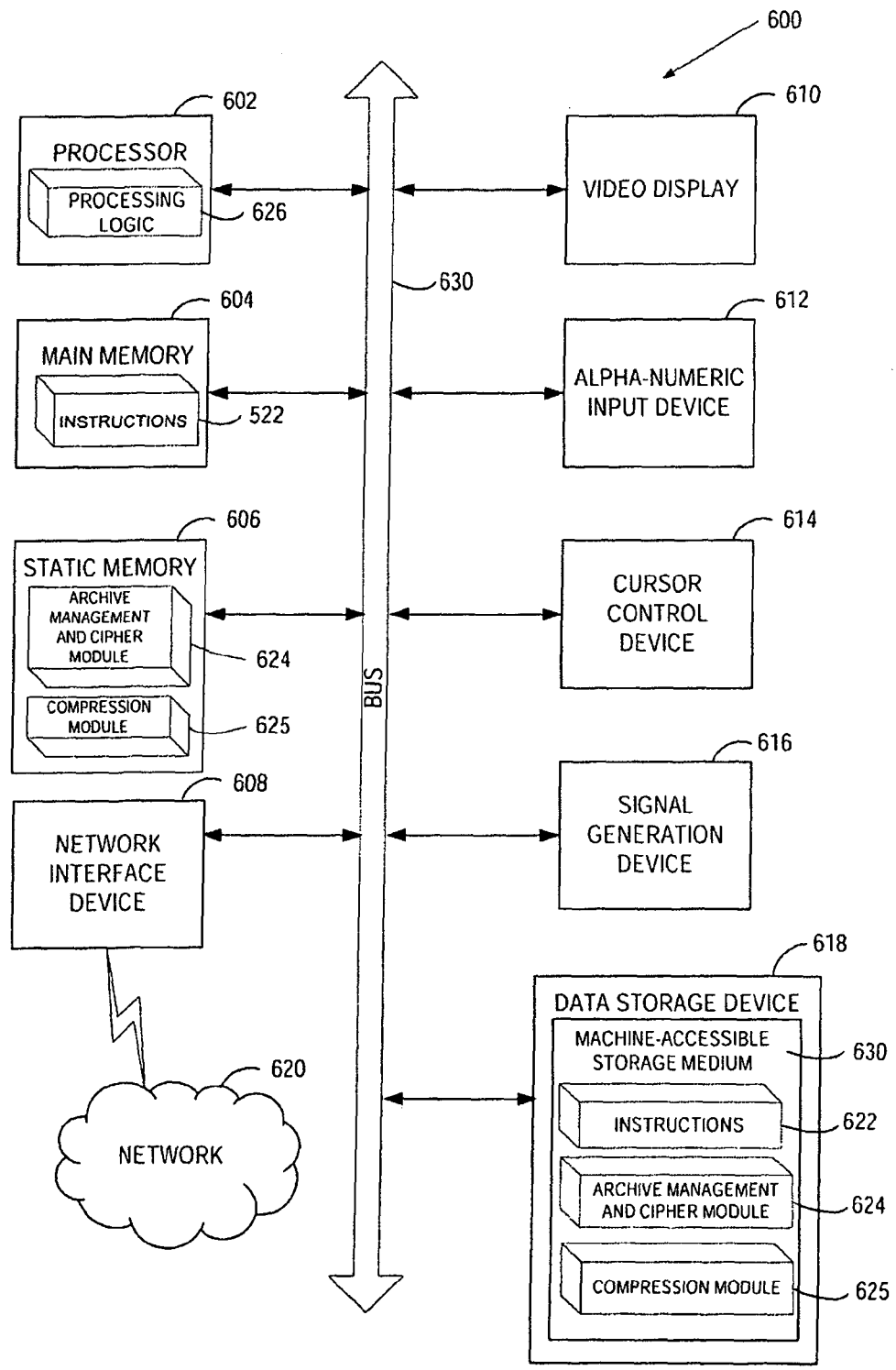
FIG. 6 is a block diagram illustrating an example of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 630 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-accessible storage media. The software 622 may further be transmitted or received over a network 620 via the network interface device 608.

The machine-accessible storage medium 630 may also be used to store an archive management and cipher module 624, and a compression module 625 as presently described. The archive management and cipher module 624, and compression module 625 may also be stored in other sections of computer system 600, such as static memory 606.

While the machine-accessible storage medium 630 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving a stream associated with an archive stored in a storage device associated with a computing device, wherein the stream associated with the archive is enciphered with an archive key;
   generating, by a processing device, a pseudo-stream comprising a plurality of words selected from a natural language;
   attaching the pseudo-stream to the stream associated with the archive;
   associating the pseudo-stream with first validation data;
   compressing the pseudo-stream;
   associating the compressed pseudo-stream and the stream associated with the archive with second validation data;
   enciphering the compressed pseudo-stream with the archive key;
   storing the enciphered compressed pseudo-stream in association with the stream associated with the archive in the storage device associated with the computing device;
   retrieving the enciphered compressed pseudo-stream from the storage device;
   deciphering the retrieved enciphered compressed pseudo-stream with the archive key to generate a third validation data;
   decompressing the deciphered compressed pseudo-stream to generate a fourth validation data;
   determining, without deciphering the stream of the archive, that the archive key is valid in view of the first validation data being same as the fourth validation data and the second validation data being same as the third validation data; and responsive to determining that the archive key is valid, deciphering the stream of the archive using the archive key.

2. The method of claim 1 wherein the pseudo-stream comprises random text.

3. The method of claim 2 wherein the pseudo-stream comprises between 1000 bytes to 2000 bytes of words from English language selected at random.

4. The method of claim 2 wherein the pseudo-stream comprises small number of characters fewer than 2,000, taken as words from at least one of English or another natural language, encoded in binary form in at least one of ASCII, UTF-8, or some other character encoding.

5. The method of claim 1 wherein attaching the pseudo-stream to the stream comprises adding the pseudo-stream in front of the stream.

6. The method of claim 1, wherein the first validation data comprises a first Cyclic Redundancy Check (CRC) value associated with the pseudo-stream, and the second validation data comprises a second CRC value associated with the compressed pseudo-stream, and wherein enciphering further comprises:
enciphering a block of data from the archive with the archive key.

7. The method of claim 1 wherein determining that the archive key is valid comprises:
computing a Cyclic Redundancy Check (CRC) value over the deciphered compressed pseudo-stream; and
determining validity of the computed CRC value.

8. The method of claim 1 wherein determining that the archive key is valid comprises:
decompressing the deciphered compressed pseudo-stream; and
determining validity of the decompression.

9. The method of claim 1 wherein determining that the archive key is valid comprises:
computing a Cyclic Redundancy Check (CRC) value of the decompressed deciphered pseudo-stream; and
determining validity of the CRC value with an expected CRC value.

10. An apparatus comprising:
a memory associated with a computing device to store data;
a processing device, operatively coupled to the memory to manage storage of the data to:
receive a stream associated with an archive stored in the memory, wherein the stream associated with the archive is enciphered with an archive key;
generate a pseudo-stream comprising a plurality of words selected from a natural language;
attach the pseudo-stream to the stream associated with the archive;
associate the pseudo-stream with first validation data; compress the pseudo-stream;
associate the compressed pseudo-stream and the stream associated with the archive with second validation data;
encipher the compressed pseudo-stream with the archive key;
store the enciphered compressed pseudo-stream in association with the stream associated with the archive in the memory associated with the computing device;
retrieving the enciphered compressed pseudo-stream from the memory;

deciphering the retrieved enciphered compressed pseudo-stream with the archive key to generate a third validation data;
decompressing the deciphered compressed pseudo-stream to generate a fourth validation data;
determining, without deciphering the stream of the archive, that the archive key is valid in view of the first validation data being same as the fourth validation data and the second validation data being the same as the third validation data; and
responsive to determining that the archive key is valid, deciphering the stream of the archive using the archive key.

11. The apparatus of claim 10 wherein to attach the pseudo-stream, the processing device is further to add the pseudo-stream in front of the stream associated with the archive and wherein the pseudo-stream comprises random text.

12. The apparatus of claim 11 wherein the first validation data comprises a first Cyclic Redundancy Check (CRC) value associated with the pseudo-stream, and the second validation data comprises a second CRC value associated with the compressed pseudo-stream.

13. The apparatus of claim 10, wherein the processing device is to compute a Cyclic Redundancy Check (CRC) value over the deciphered compressed pseudo-stream, and to determine validity of the computed CRC value.

14. The apparatus of claim 10 wherein the processing device is to:
compute a Cyclic Redundancy Check (CRC) value of the decompressed deciphered pseudo-stream; and
determine validity of the CRC value with an expected CRC value.

15. A non-transitory computer readable storage medium comprising data that, when accessed by a processing device, cause the processing device to:
receive a stream associated with an archive stored in a storage device associated with a computing device, wherein the stream associated with the archive is enciphered with an archive key;
generate, by the processing device, a pseudo-stream comprising a plurality of words selected from a natural language;
attach the pseudo-stream to the stream associated with the archive;
associate the pseudo-stream with first validation data;
compress the pseudo-stream;
associate the compressed pseudo-stream and the stream associated with the archive with second validation data;
encipher the compressed pseudo-stream with the archive key;
store the enciphered compressed pseudo-stream in association with the stream associated with the archive in the storage device associated with the computing device;
retrieve the enciphered compressed pseudo-stream from the storage device;
decipher the retrieved enciphered compressed pseudo-stream with the archive key to generate a third validation data;
decompress the deciphered compressed pseudo-stream to generate a fourth validation data;
determine, without deciphering the stream of the archive, that the archive key is valid in view of the first validation data being the same as the fourth validation data and the second validation data being the same as the third validation data; and responsive to determining that the archive key is valid, decipher the stream of the archive using the archive key.

16. The non-transitory computer readable storage medium of claim 15 wherein the pseudo-stream comprises small number of characters fewer than 2,000, taken as words from English or another natural language, encoded in binary form in ASCII, UTF-8, or some other character encoding.

17. The non-transitory computer readable storage medium of claim 15 wherein to attach the pseudo-stream to the stream, the processing device is further to add the pseudo-stream in front of the stream.

* * * * *